United States Patent [19]

Casey

[11] Patent Number: 4,993,602

[45] Date of Patent: Feb. 19, 1991

[54] PRESSURE RELIEF DEVICE FOR A PRESSURIZED CONTAINER

[75] Inventor: Donald P. Casey, Indian Shores, Fla.

[73] Assignee: PRD, Inc., Clearwater, Fla.

[21] Appl. No.: 362,769

[22] Filed: Jun. 7, 1989

[51] Int. Cl.$^5$ .............................................. B65D 83/00
[52] U.S. Cl. ..................................... 222/396; 222/397; 137/852; 137/859; 220/209; 220/DIG. 27
[58] Field of Search ............. 222/396, 397; 220/89 A, 220/DIG. 27, 207, 209; 137/852, 859

[56] References Cited

U.S. PATENT DOCUMENTS

| | | | |
|---|---|---|---|
| 3,070,265 | 12/1962 | Everett | 222/386.5 |
| 3,245,578 | 4/1966 | Sutton | 222/397 X |
| 3,283,960 | 11/1966 | Williams | 222/397 |
| 3,292,826 | 12/1966 | Abplanalp | 222/397 |
| 3,299,960 | 1/1967 | Stern | 169/23 |
| 3,357,601 | 12/1967 | Crawford | 222/397 |
| 3,363,810 | 1/1968 | Meshberg | 222/397 |
| 3,405,838 | 10/1968 | Preisendanz | 220/44 |
| 3,450,305 | 6/1969 | Kinnavy | 220/89 A |
| 3,527,388 | 9/1970 | Cooprider | 222/193 |
| 3,566,910 | 3/1971 | Doremus | 137/323 |
| 3,622,051 | 11/1971 | Benson | 222/397 |
| 3,638,840 | 2/1972 | Ishida | 222/402.24 |
| 3,659,755 | 5/1972 | Prussin | 222/397 |
| 3,664,557 | 5/1972 | Bruce | 222/397 |
| 3,669,316 | 6/1972 | Corsette | 222/193 |
| 3,680,743 | 8/1972 | Reinnagel | 222/397 |
| 3,724,727 | 4/1973 | Zundel | 222/397 |
| 3,741,445 | 6/1973 | Green | 222/397 |
| 3,762,431 | 10/1973 | Wilson | 137/116.3 |
| 3,786,967 | 1/1974 | Giocomo | 222/397 |
| 3,912,130 | 10/1975 | Pelton | 222/396 |
| 3,913,614 | 10/1975 | Speck | 220/209 X |
| 3,949,934 | 4/1976 | Goglio | 222/396 X |
| 3,994,749 | 11/1976 | Decker | 220/209 X |
| 4,210,255 | 7/1980 | Pan | 220/209 |
| 4,420,015 | 12/1983 | Blaser | 220/209 X |
| 4,588,101 | 5/1986 | Ruegg | 222/397 X |

FOREIGN PATENT DOCUMENTS

| | | | |
|---|---|---|---|
| 449601 | 7/1948 | Canada . | |
| 919137 | 1/1973 | Canada | 222/57 |
| 987274 | 4/1976 | Canada | 222/59 |
| 2273209 | 12/1975 | France . | |
| 854307 | 11/1960 | United Kingdom | 125/3 |

Primary Examiner—Andres Kashnikow
Assistant Examiner—Gregory L. Huson
Attorney, Agent, or Firm—Zarley, McKee, Thomte, Voorhees & Sease

[57] ABSTRACT

A pressure relief device is provided for pressurized containers to relieve excessive pressures from the container. The device includes a base mounted in one wall of the container. The base has a hole which is normally sealed by a sealing membrane, which is held in place by a sealing washer, an elastomeric element and a retention washer mounted within the cavity of the base. The elastomeric element allows the sealing membrane to yield from the hole when the pressure within the container increases to a predetermined cracking pressure, thereby providing communication between the interior of the container and the atmosphere for releasing pressure from the container. The pressure relief device can be assembled for various cracking pressures due to the elastomeric compression element.

14 Claims, 2 Drawing Sheets

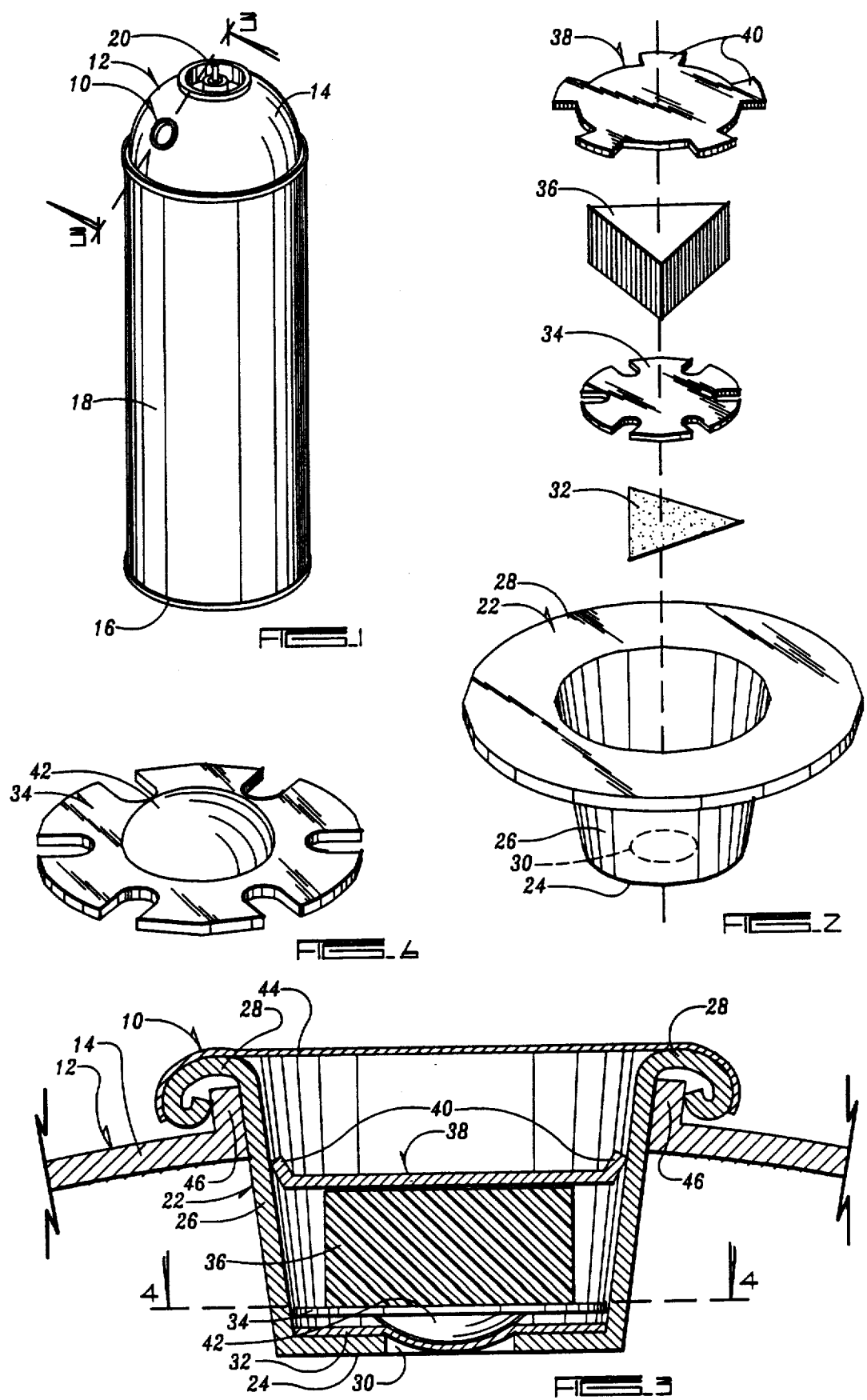

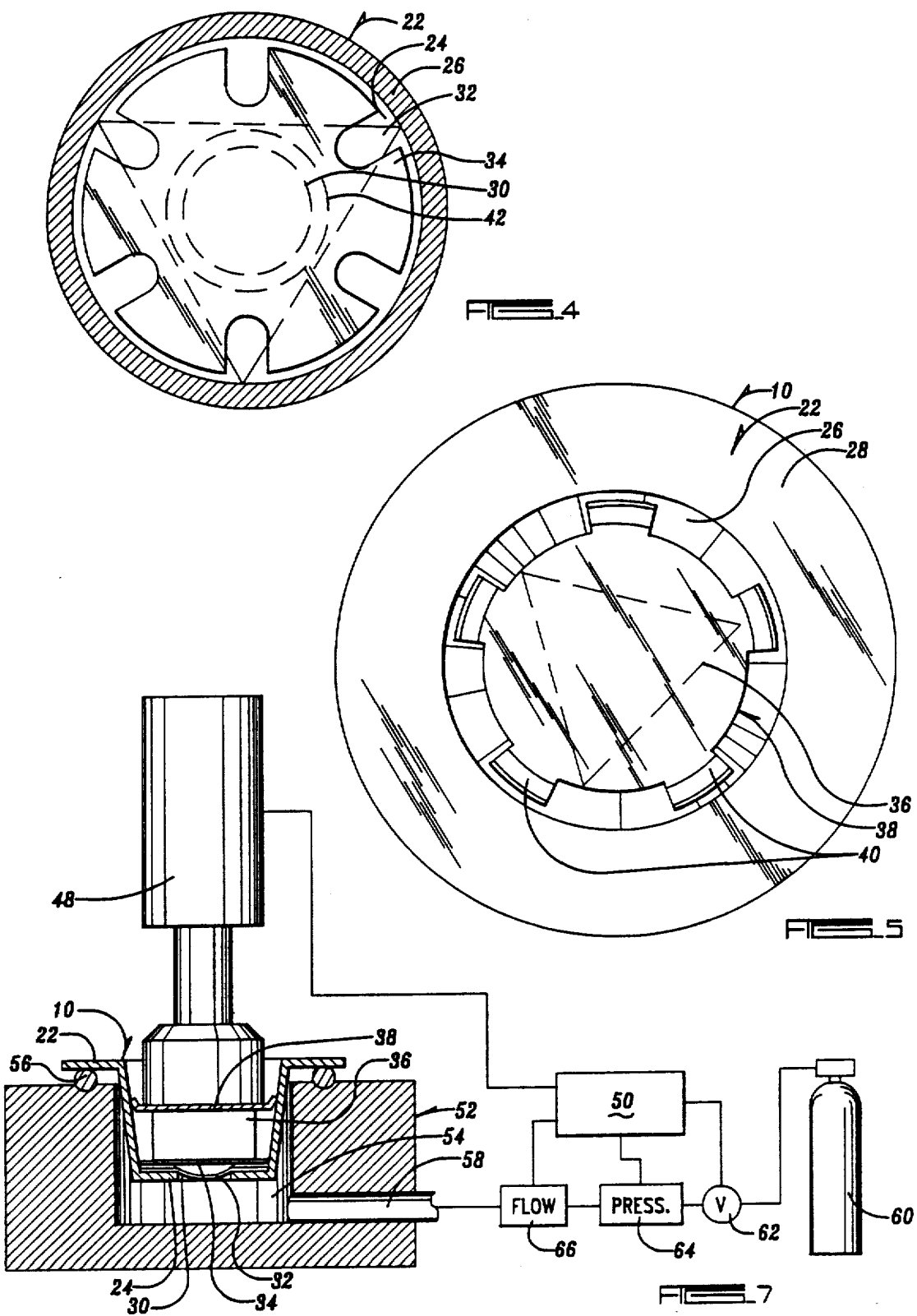

4,993,602

PRESSURE RELIEF DEVICE FOR A PRESSURIZED CONTAINER

BACKGROUND OF THE INVENTION

The present invention generally relates to a pressure relief device for pressurized containers. Conventionally, pressurized containers such as aerosol cans are made with sufficient strength to withstand the pressure imposed upon them during the loading of the contents of the container. However, exposure of the container to excessive heat can increase the pressure within the container and cause the container to explode. Thus, there is a need for a pressure relief device which will automatically release unsafe excessive pressure from the container. Also, since most aerosol cans are disposable and not intended for reuse, the pressure relief device must have a low cost.

Various types of pressure relief valves have been provided in the prior art, none of which have been completely satisfactory. For example, safety vents through the product dispensing nozzle can become easily plugged due to the small orifice size and therefore are not adequately safe. Spring-type relief valves are costly to manufacture and assemble. Weakened rupture areas in the wall of the container are difficult to provide with precise tolerances, and once ruptured, the entire contents of the container are blown out and lost. Also, scoring of the internal finish of the container is unacceptable in many instances due to corrosion problems.

Accordingly, a primary objective of the present invention is the provision of a pressure relief device for pressurized containers which is economical to manufacture.

Another objective of the present invention is the provision of a pressure relief device which could be easily and economically mounted on aerosol cans.

A further objective of the present invention is the provision of a pressure relief device which is compatible with many types of materials.

Yet another objective of the present invention is the provision of a pressure relief device which can be easily manufactured to designed tolerances so as to have accurate and safe performance.

Another objective is the provision of a pressure relief device which re-seals itself after excessive pressure has been relieved from the container.

Still a further objective of the present invention is the provision of a pressure relief device which is tamper resistant.

These and other objectives will become apparent from the following description of the invention.

BRIEF DESCRIPTION OF THE DRAWINGS

FIG. 1 is a perspective view of an aerosol can having the pressure relief device of the present invention incorporated therein.

FIG. 2 is an exploded perspective view of the pressure relief device of the present invention.

FIG. 3 is a partial sectional view of the device of the present invention.

FIG. 4 is a top sectional view taken along lines 4—4 of FIG. 3.

FIG. 5 is a top plan view of the device of the present invention.

FIG. 6 is a perspective view showing the bottom surface of the pressure sealing washer of the present invention.

FIG. 7 is a schematic showing a method of assembling the pressure relief device of the present invention.

DETAILED DESCRIPTION OF THE DRAWINGS

The pressure relief device of the present invention is generally designated by reference numeral 10 in the drawings. Device 10 is mounted in one wall of a pressurized container 12, such as an aerosol can. Container 12 is shown to have a top wall 14, a bottom wall 16, and an interconnecting sidewall 18. Device 10 can be mounted into any wall of the container, but is shown in FIG. 1 to be mounted in top wall 14. Container or can 12 also has a conventional spray nozzle 20 for selectively dispensing the contents of the can.

Device 10 includes a base or housing 22 having a bottom wall 24, a sidewall 26 extending from bottom wall 24 so as to define a cavity within the base, and an annular flange or lip 28 extending from sidewall 26. Bottom wall 24 has a centrally located hole 30, as best seen in FIG. 3.

Device 10 further includes a sealing membrane 32, a pressure sealing washer 34, an elastomeric compression element 36, and a retaining washer 38. These components are stacked one upon the other, as seen in FIGS. 2 and 3, within the cavity of base 22. Thus, sealing membrane is normally in sealing engagement with the bottom wall 24 of base 22 so as to prevent communication between the interior of the container and the atmosphere. Preferably, sealing washer 34 has a convex dome area 42 on the lower surface thereof, as seen in FIGS. 3 and 6. Dome 42 seats washer 34 in position over hole 30, and partially deforms membrane 32 into hole 30 so as to assure a proper seal. Retaining washer 38 has tabs 40 which frictionally engage sidewall 26 of base 22 so as to hold sealing membrane 32, sealing washer 34 and elastomeric element 36 in place within the base cavity.

As a safety feature, an integrity cover seal 44 may be provided over lip 28 so as to indicate tampering with device 10. Also, seal 44 will break upon release of excessive pressure from the container and thereby indicate that the device has been activated.

Preferably, base 22 is made of a strong material, such as deep drawn or formed steel. The cavity of the base is approximately $\frac{1}{4}'$ to $5/16'$ in diameter, with the hole having an approximate $1/16'$ diameter. The thickness of the upper flange or lip 28 is approximately $0.01'$ so as to allow the base to be roll formed onto a corresponding lip 46 on the wall 14 of container 12, as seen in FIG. 3.

The sealing membrane may be made of various materials, depending on the contents of the container. The material of the sealing membrane must be compatible with the contents so as to prevent degradation or other failing of the membrane. Membrane 32 may be made of single or dual film layers. Examples of acceptable materials are Dupont's "Tefzel" film, a tetrafluoroethylene/ethylene copolymer; Dupont's "Kapton" type HN polyimide film; or Dupont's "Teflon" fluorinated ethylene propylene copolymer (FEP). Preferably, the sealing membrane has a thickness of approximately $0.002'$.

Pressure sealing washer 34 is preferable made from a substantially rigid material such as nylon or other suitable plastic. Also, washer 34 may have a dome area 42 on both sides for easier assembly during the assembly process.

Compression element 36 is made of an elastomeric material, such as a silicone rubber. One example of such a material is Dow Chemical's cured and cross-linked type SE44/U rubber. Preferably, element 36 is approximately 0.1' in thickness. Retaining washer 38 is constructed of a rigid material, such as tempered steel, and is preferably approximately 0.01' in thickness.

During assembly of device 10, sealing membrane 32, sealing washer 34, compression element 36, and retaining washer 38 are press fit into the cavity of base 22 by a ram 48 operatively connected to a computer or microprocessor 50. The compression set of device 10 is directly related to the cracking pressure of the device. By increasing the pressure set, the cracking pressure is increased. Cracking pressures ranging from 40 to 5000 psi are attainable with the device of the present invention, using the same compression element 36.

Quality control testing of devices 10 can be performed using the microprocessor 50, as shown in FIG. 7. More particularly, for testing purposes, device 10 is positioned on a testing block 52, which can also be used for the assembly of device 10. Testing block 52 has a well 54 therein for receiving base 22, while flange 28 seals against an 0-ring 56. A pressure line 58 is provided between well 54 and a pressurized gas tank 60, with a control valve 62, pressure gauge 64, and flow regulator 66 provided in line 58. The valve, gauge and regulator are also in communication with the microprocessor 50. During the quality control testing, back pressure can be supplied to well 54 through line 58. With this setup, the cracking pressure of the assembled device 10 can be checked for the desired design parameters and tolerances.

In operation, device 10 will remain intact, with the seal between sealing membrane 32 and bottom wall 24 of base 22 being unbroken. If the pressure within container 12 increases to a sufficient level, that is, the crack pressure established during assembly of device 10, element 36 is compressed by the pressure force against sealing membrane 32 and sealing washer 34, so that the seal is broken to allow pressure to escape through hole 30 and along the sidewall 26 of base 22. When the pressure drops to a safe level, element 36 expands to reseal membrane 32 around hole 30.

For the foregoing, it can be seen that the present invention accomplishes at least all of the stated objectives.

What is claimed is:

1. A pressure relief device for a normally vertical pressurized container having a top wall, a bottom wall, an interconnecting vertical sidewall, and valve means mounted on the container for selectively dispensing the contents of the container, the device comprising:
a base member mounted in one wall of the container apart from the valve means, and having a hole therein to provide communication between the interior of the container and the atmosphere;
sealing means in said base member positioned over said hole;
a compressible elastomeric element in said base member positioned over said sealing means; and
retention means for retaining said sealing means and elastomeric element in said base member whereby the sealing means is normally in sealing engagement with said hole in said base member so as to prevent communication between the interior of the container and the atmosphere, and whereby the elastomeric means compresses to allow the sealing means to yield from said hole upon the rise of pressure in the container to a predetermined cracking pressure and thereby provide communication between the interior of the container and the atmosphere for releasing pressure from the container,
said sealing means including a sealing membrane adjacent said bottom lower portion of said base member,
a sealing washer positioned over said sealing membrane, said sealing washer having opposite upper and lower surfaces, and a central convex dome on said lower surface for seating said sealing washer over said hole,
said lower surface normally maintaining said sealing member in sealing engagement with said bottom wall portion of said base member, with said dome deforming said sealing membrane into said hole in said base member.

2. A pressure relief device for a normal vertical pressurized container having a top wall, a bottom wall, an interconnecting vertical sidewall, and valve means mounted on the container for selectively dispensing the contents of the container, the device comprising:
a base member mounted in one wall of the container apart from the valve means and having a bottom wall portion with a hole therein, a sidewall extending from the bottom wall portion so as to define a cavity, and an annular lip extending around said sidewall;
sealing member positioned within said cavity of said base member over said hole;
sealing washer positioned within said cavity over said sealing membrane;
a compressible elastomeric element positioned within said cavity over said sealing washer;
retention means positioned within said cavity over said elastomeric element and frictionally engaging said sidewall of said base member so as to retain said sealing membrane, said sealing washer and said elastomeric member within said cavity;
whereby said sealing membrane is normally held by said sealing washer, elastomeric element and retention means in sealing engagement with said hole to prevent communication between the interior of said container and the atmosphere, and whereby, upon sufficient increase of pressure within said container, said elastomeric element is compressed between said sealing washer and retention means to allow said sealing membrane to yield from said hole and thereby provide communication between the interior of the container and the atmosphere for releasing pressure from said container
said sealing washer having opposite upper and lower surfaces, and a central convex dome on said lower surface for sealing said washer over said hole,
said lower surface normally maintaining said sealing membrane in sealing engagement with said bottom wall portion, and
said dome deforming said sealing membrane into said hole in said base member.

3. A normally vertical pressurized container, comprising:
a top wall;
a bottom wall; a sidewall interconnecting said top and bottom walls;
valve means mounted on said container for selectively dispensing the contents thereof; and
a pressure relief means mounted in one wall of said container apart from said valve means for relieving excessive pressure within the container, the said pressure relief means including a base member with a hole therein through which excessive pressure is released, sealing means normally closing said hole, a compressible elastomeric element for normally holding said sealing means in sealing engagement over said hole, and retention means secured within said base member to retain said sealing means and elastomeric element within said base member, whereby upon sufficient increase of pressure within said container, said elastomeric element compresses to allow said sealing means to yield from said hole and thereby provide communication between the interior of said container to the atmosphere for releasing pressure from said container said sealing means including a sealing membrane adjacent said bottom wall portion, a sealing washer positioned over said sealing membrane, said sealing washer having opposite upper and lower surfaces, and a central convex dome on said lower surface for seating said sealing washer over said hole, said lower surface normally maintaining the sealing member in sealing engagement with said bottom wall portion, and said dome deforming said sealing membrane into said hole in said base member.

4. A pressure relief for a normally vertical pressurized container having a top wall, a bottom wall, an interconnecting vertical sidewall, and valve means mounted on the container for selectively dispensing the contents of the container, the device comprising:

a base member mounted in one wall of the container apart from the valve means, and having a hole therein to provide communication between the interior of the container and the atmosphere;

a normally freely movable sealing means in said base member positioned over said hole;

compressible elastomeric element in said base member positioned over said sealing means;

retention means for retaining said sealing means and elastomeric element in said base member whereby the sealing means is normally in sealing engagement with said hole in said base member so as to prevent communication between the interior of the container and the atmosphere, and whereby the elastomeric means compresses to allow the sealing means to yield from said hole upon the rise of pressure in the container to a predetermined cracking pressure and thereby provide communication between the interior of the container and the atmosphere for releasing pressure from the container;

the base including a bottom wall portion, a sidewall extending from said bottom wall portion so as to define a cavity, and an annular upper flange extending around said sidewall, said hole being in said bottom wall portion.

said sealing means including a sealing membrane adjacent said bottom wall portion of said base member, and a sealing washer positioned over said sealing membrane; and said sealing washer having opposite upper and lower surfaces, and a central convex dome on said lower surface for seating said sealing washer over said hole, the lower surface normally maintaining said sealing member in sealing engagement with said bottom wall portion of said base member, with said dome deforming said sealing membrane into said hole in said base member.

5. A pressure relief device for a pressurized container having opposite end walls, an interconnecting side wall, and valve means mounted on the container for selectively dispensing the contents of the container, the device comprising:

a base member mounted in one of said walls of the container apart from the valve means and having an end wall portion with a hole therein, a sidewall extending from the end wall portion so as to define a cavity, and an annular lip extending around said sidewall;

a normally freely movable sealing membrane positioned within said cavity of said base member over said hole;

a normally freely movable sealing washer positioned within said cavity over said sealing membrane;

a compressible elastomeric element positioned within said cavity over said sealing membrane;

retention means positioned within said cavity over said elastomeric element and frictionally engaging said sidewall of said base member so as to retain said sealing membrane, said sealing washer and said elastomeric member within said cavity;

whereby said sealing membrane is normally held by said sealing washer, elastomeric element and retention means in sealing engagement with said hole to prevent communication between the interior of said container and the atmosphere, and whereby, upon sufficient increase of pressure within said container, said elastomeric element is compressed between said sealing washer and retention means to allow said sealing membrane to yield from said hole and thereby provide communication between the interior of the container and the atmosphere for releasing pressure from said container; and said sealing washer having opposite upper and lower surfaces, and a central convex dome on said lower surface for seating said sealing washer over said hole, the lower surface normally maintaining said sealing member in sealing engagement with said end wall portion, and said dome deforming said sealing membrane into said hole in the base member.

6. A normally vertical pressurized container, comprising:

a top wall;

a bottom wall;

a side wall interconnecting said top and bottom walls;

valve means mounted on said container for selectively dispensing the contents thereof;

a pressure relief means mounted in one wall of said container apart from said valve means for relieving excessive pressure within the container, the said pressure relief means including a base member with a hole therein through which excessive pressure is released, a normally freely movable sealing means normally closing said hole, a compressible elastomeric element for normally closing said hole, a compressible elastomeric element for normally holding said sealing means in sealing engagement over said hole, and retention means secured within said base member to retain said sealing means and elastomeric element within said base member, whereby upon sufficient increase of pressure within said container, said elastomeric element compresses to allow said sealing means to yield from said hole and thereby provide communication between the interior of said container to the atmosphere for releasing pressure from said container;

said sealing means including a sealing membrane adjacent said bottom wall portion, and a sealing washer positioned over said sealing membrane; and said sealing washer having opposite upper and lower surfaces, and a central convex dome on said lower surface for seating said sealing washer over said hole, said lower surface normally maintaining said sealing member in sealing engagement with said bottom wall portion, and said dome deforming said sealing membrane into said hole in said base member.

7. A pressure relief device for a normal vertical pressurized container having a top wall, a bottom wall, an interconnecting vertical sidewall, and valve means mounted on the container for selectively dispensing the contents of the container, the device comprising:

a base member mounted in one wall of the container apart from the valve means and having a bottom wall portion with a hole therein, a sidewall extending from the bottom wall portion so as to define a cavity, and an annular lip extending around said sidewall;

a normally freely movable sealing membrane positioned within said cavity of said base member over said hole;

a normally freely movable sealing washer positioned within said cavity of said base member over said hole;

a normally freely movable sealing washer positioned within said cavity over said sealing membrane, since sealing washer having opposite upper and lower surfaces, and a central convex dome on said lower surface for seating said sealing washer over said hole, the lower surface maintaining said sealing member in sealing engagement with said bottom wall portion, and said dome deforming said sealing membrane into said hole in the base member;

a compressible elastomeric element positioned within said cavity over said sealing washer;

retention means positioned within said cavity over said elastomeric element and frictionally engaging said sidewall of said base member so as to retain said sealing membrane, said sealing washer and said elastomeric member within said cavity;

whereby said sealing membrane is normally held by said sealing washer, elastomeric element and retention means in sealing engagement with said hole to prevent communication between the interior of said container and the atmosphere, and whereby, upon sufficient increase of pressure within said container, said elastomeric element is compressed between said sealing washer and retention means to allow said sealing membrane to yield from said hole and thereby provide communication between the interior of the container and the atmosphere for releasing pressure from said container.

8. The device of claim 7 wherein said sealing means, elastomeric element and retention means are shaped so as to allow fluid communication between the interior of the container and the atmosphere along said sidewall of said base member.

9. The device of claim 7 wherein the cracking pressure of the device is dependent upon the compression of the elastomeric element.

10. The device of claim 7 further including an integrity seal secured to said base over the retention means so as to be visible from the exterior of the container, the seal being broken upon release of pressure from the container through the device or other compromise of the device.

11. A normally vertical pressurized container, comprising:

a top wall;

a bottom wall;

a sidewall interconnecting said top and bottom walls;

valve means mounted on said container for selectively dispensing the contents thereof; and a pressure relief means mounted in one wall of said container apart from said valve means for relieve excessive pressure within the container, the said pressure relief means including a base member with a hole therein through which excessive pressure is released, a normally freely movable sealing means normally closing said hole, a compressible elastomeric element for normally holding said sealing means in sealing engagement over said hole, and retention means secured within said base member to retain said sealing means and elastomeric element within said base member, whereby upon sufficient increase of pressure within said container, said elastomeric element compresses to allow said sealing means to yield from said hole and thereby provide communication between the interior of said container to the atmosphere for releasing pressure from said container;

said sealing means including a sealing membrane adjacent said bottom wall portion, and a sealing washer positioned over said sealing membrane, said sealing washer having opposite upper and lower surface, a central convex dome on said lower surface for seating said sealing washer over said hole, said lower surface normally maintaining said sealing member in sealing engagement with said bottom wall portion, and said dome deforming said sealing membrane into said hole in said base member.

12. The device of claims 11 further including an integrity seal secured to said base member over said retention means so as to be visible from the exterior of the container, said seal being broken upon release of pressure from said container through the device.

13. The device of claim 11 wherein said base member includes a bottom wall portion, a sidewall extending from the bottom wall portion so as to define a cavity, and an annular upper flange extending around said sidewall, said hole being in the bottom wall portion; and said sealing means, elastomeric element, and retention means being positioned within said cavity of said base member.

14. The device of claim 13 wherein said retention means frictionally engages said sidewall of said base member to retain said sealing means and elastomeric element in said cavity of said base member.

* * * * *